United States Patent
Yu et al.

(10) Patent No.: US 9,276,898 B2
(45) Date of Patent: Mar. 1, 2016

(54) METHOD AND DEVICE FOR LINK FAULT DETECTING AND RECOVERING BASED ON ARP INTERACTION

(75) Inventors: Liyuan Yu, Guangdong (CN); Xiaoxiang Wu, Guangdong (CN); Dongmei Liu, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 132 days.

(21) Appl. No.: 13/991,805

(22) PCT Filed: Feb. 18, 2011

(86) PCT No.: PCT/CN2011/071082
§ 371 (c)(1),
(2), (4) Date: Jun. 5, 2013

(87) PCT Pub. No.: WO2012/075731
PCT Pub. Date: Jun. 14, 2012

(65) Prior Publication Data
US 2013/0272111 A1    Oct. 17, 2013

(30) Foreign Application Priority Data
Dec. 7, 2010  (CN) .......................... 2010 1 0576909

(51) Int. Cl.
*H04L 29/12* (2006.01)
*H04L 12/26* (2006.01)
(Continued)

(52) U.S. Cl.
CPC .......... *H04L 61/103* (2013.01); *H04L 43/0811* (2013.01); *H04L 43/10* (2013.01); *H04L 45/22* (2013.01); *H04L 45/28* (2013.01)

(58) Field of Classification Search
CPC ....... H04L 43/00; H04L 43/10; H04L 43/103; H04L 43/12; H04L 43/08; H04L 43/0811; H04L 45/00; H04L 45/02; H04L 45/21; H04L 45/026; H04L 45/028
See application file for complete search history.

(56) References Cited

U.S. PATENT DOCUMENTS 6,304,546 B1 * 10/2001 Natarajan et al. ............. 370/216
7,007,101 B1 *  2/2006 Schwaderer .................. 709/238
(Continued)

FOREIGN PATENT DOCUMENTS

CN        1630268      6/2005
CN      101026567      8/2007
(Continued)

OTHER PUBLICATIONS

International Search Report for PCT/CN2011/071082, English translation attached to original, Both completed by the Chinese Patent Office on Aug. 27, 2011, All together 7 pages.

*Primary Examiner* — Anh-Vu Ly
*Assistant Examiner* — Hector Reyes Ortiz
(74) *Attorney, Agent, or Firm* — Brooks Kushman P.C.

(57) ABSTRACT

A method for link fault detection and recovery based on Address Resolution Protocol (ARP) interaction, including: configuring an IP address and a mask code, a strategy routing or static routing module and an ARP module for network devices of a home terminal and an opposite terminal; the strategy routing or static routing module regularly inquiring whether an ARP entry to which a next hop corresponds exists, if the ARP entry exists, a link being available, otherwise, notifying the ARP module to perform keepalive on the next hop; and the ARP module performing a process of keepalive on the next hop, and after performing keepalive on the next hop, notifying the strategy routing or static routing module to judge whether the link is available. Further, a device for link fault detection and recovery based on ARP interaction.

10 Claims, 3 Drawing Sheets

(51) Int. Cl.
*H04L 12/707* (2013.01)
*H04L 12/703* (2013.01)

(56) References Cited

U.S. PATENT DOCUMENTS

| | | | |
|---|---|---|---|
| 2003/0016624 A1* | 1/2003 | Bare | 370/217 |
| 2007/0047549 A1* | 3/2007 | Park | 370/392 |
| 2007/0147395 A1 | 6/2007 | Chen et al. | |
| 2008/0071919 A1 | 3/2008 | Gupta et al. | |
| 2009/0034542 A1* | 2/2009 | He | 370/400 |
| 2010/0039956 A1* | 2/2010 | Zheng | 370/252 |
| 2010/0121946 A1* | 5/2010 | Claes et al. | 709/223 |

FOREIGN PATENT DOCUMENTS

| | | |
|---|---|---|
| CN | 101030890 | 9/2007 |
| CN | 101170459 | 4/2008 |
| CN | 101695036 | 4/2010 |
| CN | 101771618 | 7/2010 |

* cited by examiner

METHOD AND DEVICE FOR LINK FAULT DETECTING AND RECOVERING BASED ON ARP INTERACTION

CROSS-SECTION TO RELATED APPLICATIONS

This application is the U.S. national phase of PCT Application No. PCT/CN2011/071082 filed Feb. 18, 2011 which claims priority to Chinese Patent Application Serial No. 201010576909.3 filed Dec. 7, 2010, the disclosures of which are incorporated herein by reference.

TECHNICAL FIELD

The present document relates to the field of data communications, and in particular, to a method and device for link fault detection and recovery based on Address Resolution Protocol (ARP) interaction.

BACKGROUND OF THE RELATED ART

Static routing refers to routing information configured manually by a network manager. When a topology structure of a network or a link state has a change, the network manager needs to manually modify the related static routing information in a routing table. The static routing information is private by default, and will not be transferred to other routers. Of course, the network manager can also make the static routing information become shared by setting a router.

Strategy routing is a data packet routing forward mechanism which is more flexible than routing based on a target network. Using the strategy routing, the router will determine how to process a data packet needed to be routed through a routing map, wherein the routing map determines a next-hop forwarding router of one data packet. With the strategy routing, the routing map used by the strategy routing must be specified, and the routing map needs to be created. One routing map is comprised of lots of strategies, and each strategy defines one or more matching rules and corresponding operations. After the strategy routing is applied on one interface, all packets received by this interface are detected, and a data packet which does not comply with any strategy in the routing map will be processed in accordance with a usual routing forward, and a data packets which complies with a certain strategy in the routing map will be processed in accordance with the operation defined in the strategy.

Equal-Cost Multipath Routing (ECMP) exists in a network environment where a plurality of different links arrive at the same destination address. If a traditional routing technology is used, the data packets transmitted to the destination address can only use one link therein, and other links are in a standby state or a failure state, and it is needed a certain time for switching with each other in a dynamic routing environment; however, an equal-cost or equal-value multipath routing protocol can use a plurality of links at the same time in the above-mentioned network environment, which not only increases transmission bandwidth, but also can back up the data transmission of the failure link without delay and packet loss. The greatest characteristic of the ECMP is to implement the purpose of multipath load balancing and link backup with equal-cost or equal-value, and both the strategy routing and the static routing substantially support the ECMP function.

The ARP is to transform an Internet address of a machine into a physical address. The IP data packet passes through physical networks one after another when being propagation in the Internet, and when arriving at the destination network, the IP data packet needs to be transmitted through the last physical network to a destination host. When passing through the physical network, the data packet needs the physical address of the machine, while the IP address of the machine is used for the transmission of the data packet, so one mechanism is needed to transform the IP address of the machine into the physical address.

Both the static routing and the strategy routing are based on configuration, and cannot transmit messages actively, and after an outcoming interface of the routing (a physical port of a home terminal to which a link corresponds) is from down to up, the link can be used theoretically. However, in fact, the outcoming interface of the routing being up does not represent that the link is available.

For example, when the home terminal and the opposite terminal connect using a layer 1 or layer 2 device, the method of detecting whether the next hop is available using a state of the outcoming interface of the routing is not able to detect the connectivity of the next hop; when the outcoming interface of the routing is up but the link is abnormal, the ECMP uses this link, which results in that all traffic which selects this link is discarded; and, in addition, if the outcoming interface of the routing is up, the link is normal, but forwarding information (e.g., ARP) of the opposite terminal cannot be learned immediately, then it will be also resulted in discarding the traffic which is transmitted in a certain time before learning the forwarding information.

A protocol of being able to detect the link state based on IP messages is needed to detect the state of the physical link and be able to be cooperated with the static routing and the strategy routing. A Chinese patent with an application No. CN200710187500.0 (a method for fault detection and link recovery based on a bidirectional forwarding link) provides a method for detecting the physical link based on Bidirectional Forwarding Detection (BFD). The BFD supports fast detecting the link state with a message transmission interval being a minimal value of 3.3 ms, so the BFD has natural advantages in terms of fast fault detection. In the respect of fault recovery, the BFD transmits a unicast IP message to trigger ARP learning, which ensures that the traffic can be normally forwarded on the link when the BFD detects that the link fault is recovered.

However, there are some disadvantages for using the BFD to detect the link state, that is: the detection parameters need to be configured, the configured detection parameters must be consistent with those of the next hop of the routing, a plurality of the next hops need to correspond to a plurality of BFD detections, the BFD messages need to be transmitted periodically, and the shorter the detection time is, the larger the system overhead which is occupied is.

SUMMARY OF THE INVENTION

The technical problem to be solved by the present document is to provide a method and a device for link fault detection and recovery of based on ARP interaction, which solves the problem that the link detection can not be implemented after the strategy routing or the static routing is applied or the configuration is complex and the system overhead is large due to the start of the BFD.

In order to solve the above technical problem, the present document provides a method for link fault detection and recovery based on ARP interaction, and the method comprises:

configuring an IP address and a mask code, a strategy routing or static routing module and an ARP module for network devices of a home terminal and an opposite terminal;

the strategy routing or static routing module regularly inquiring whether an ARP entry to which a next hop corresponds exists, if the ARP entry exists, a link being available, otherwise, notifying the ARP module to perform keepalive on the next hop; and the ARP module performing a process of keepalive on the next hop, and after performing keepalive on the next hop, notifying the strategy routing or static routing module to judge whether the link is available.

The method further comprises: the strategy routing or static routing module scanning next hops of the configured routing entries by way of polling.

Wherein, the number of the next hops of the configured routing entries which are scanned each time is less than or equal to 100.

Wherein, the step of the ARP module performing the process of keepalive on the next hop comprises: the ARP module judging whether the ARP entry to which the next hop needed to be performed keepalive corresponds exists, and if the ARP entry exists, normally returning; and if the ARP entry does not exist, generating a corresponding unavailable (waiting) entry and transmitting an ARP request using the next hop needed to be performed keepalive as a destination IP, and updating as an available dynamic ARP entry after receiving an ARP response from the opposite terminal.

Wherein, a way of obtaining aging time and an aging message transmission interval on which the ARP module performing keepalive on the next hop is based comprises:

when the ARP module is notified by the strategy routing or static routing module to perform keepalive on the next hop, obtaining the aging time and the aging message transmission interval carried therein; or when a parameter is not set by the routing module, selecting the aging time and the aging message transmission interval of a routing keepalive attribute entry which is configured under a layer 3 interface; or when the aging time and the aging message transmission interval cannot be obtained from both of the above cases, selecting the aging time and the aging message transmission interval of a usual dynamic entry which is configured under a layer 3 interface.

The method further comprises: after the aging time expires, the ARP module transmitting a unicast ARP request message, and if receiving an ARP response, updating a dynamic ARP entry; and if not receiving the ARP response, retransmitting the unicast ARP request message every 3 seconds, and if not receiving the ARP response message after the unicast ARP request message is transmitted three times, deleting the dynamic ARP.

In order to solve the above technical problem, the present document further provides a device for link fault detection and recovery based on Address Resolution Protocol (ARP) interaction, and the device comprises:

a configuration unit, configured to configure an IP address and a mask code for network devices of a home terminal and an opposite terminal;

a strategy routing or static routing unit, configured to regularly inquire whether an ARP entry to which a next hop corresponds exists, if the ARP entry exists, a link to be available, otherwise, notify an ARP unit to perform keepalive on the next hop; and the ARP unit, configured to perform a process of keepalive on the next hop, and after perform keepalive on the next hop, notify the strategy routing or static routing unit to judge whether the link is available.

Wherein, the strategy routing or static routing unit is further configured to scan next hops of the configured routing entries by way of polling.

Wherein, the number of the next hops of the configured routing entries which are scanned each time by the strategy routing or static routing unit is less than or equal to 100.

Wherein, the ARP unit is configured to perform the process of keepalive on the next hop by the following way: judging whether the ARP entry to which the next hop needed to be performed keepalive corresponds exists, and if the ARP entry exists, normally returning; and if the ARP entry does not exist, generating a corresponding unavailable (waiting) entry and transmitting an ARP request using the next hop needed to be performed keepalive as a destination IP, and updating as an available dynamic ARP entry after receiving an ARP response from the opposite terminal.

Wherein, a way of obtaining aging time and an aging message transmission interval on which the ARP unit performing keepalive on the next hop is based comprises:

when the ARP unit is notified by the strategy routing or static routing unit to perform keepalive on the next hop, obtaining the aging time and the aging message transmission interval carried therein; or when a parameter is not set by a routing module, selecting the aging time and the aging message transmission interval of a routing keepalive attribute entry which is configured under a layer 3 interface; or when not obtaining from both of the above cases, selecting the aging time and the aging message transmission interval of a usual dynamic entry which is configured under a layer 3 interface.

Wherein, the ARP unit is further configured to: after the aging time expires, transmit a unicast ARP request message, and if receiving an ARP response, update a dynamic ARP entry; and if not receiving the ARP response, retransmit the unicast ARP request message every 3 seconds, and if not receiving the ARP response message after the unicast ARP request message is transmitted three times, delete the dynamic ARP.

Compared with the related art, the present document overcomes the problem in the related art that the link detection cannot be implemented after the strategy routing or the static routing is applied, or the configuration is complex and the system overhead is large due to the start of the BFD, and implements the purpose of routing keepalive.

BRIEF DESCRIPTION OF DRAWINGS

The accompanying drawings illustrated here are used to provide further understanding for the present document, and constitute a part of the present application; and the schematic embodiments of the present document and the illustration thereof are used to explain the present document, and do not constitute improper definition of the present document, wherein.

PREFERRED EMBODIMENTS OF THE INVENTION

Figure 1:
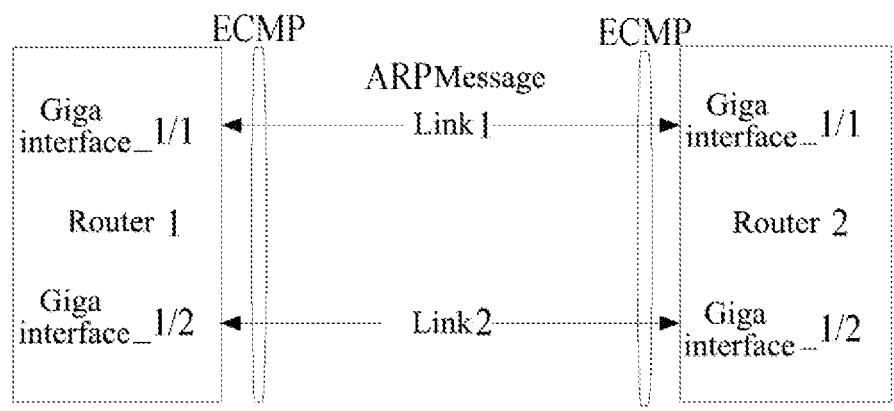
FIG. 1 is a schematic diagram of a networking of an application environment according to an embodiment of the present document.

In order to make the purpose, the technical scheme and the advantages of the present document clearer, the present document will be further described in detail in combination with the accompanying drawings below. It should be illustrated that, the embodiments of the present application and the features in the embodiments can be combined with each other arbitrarily without conflict.

The technical scheme in the embodiments of the present document is as follows.

A method for link fault detection and recovery of based on ARP interaction is provided, and the method comprises:

configuring an IP address and a mask code, a strategy routing or static routing module and an ARP module for network devices of a home terminal and an opposite terminal;

the strategy routing or static routing module regularly inquiring whether an ARP entry to which a next hop corresponds exists, if the ARP entry exists, a link being available, otherwise, notifying the ARP module to perform keepalive on the next hop; and the ARP module performing a process of keepalive on the next hop, and after performing keepalive on the next hop, notifying the strategy routing or static routing module to judge whether the link is available.

The keepalive is an abbreviation for keepalive, and is a message transmitted by one network device, and the purpose of this message is for notifying the other network device that a virtual circuit therebetween is still alive.

The strategy routing or static routing module scans next hops of the configured routing entries by way of polling.

The number of the next hops for each scan is less than or equal to 100.

The step of the ARP module performing the process of keepalive on the next hop comprises: the ARP module judging whether the ARP entry to which the next hop needed to be performed keepalive corresponds exists, and if the ARP entry exists, normally returning; and if the ARP entry does not exist, generating a corresponding unavailable (waiting) entry and transmitting an ARP request using the next hop needed to be performed keepalive as a destination IP, and updating as an available dynamic ARP entry after receiving an ARP response from the opposite terminal.

A way of obtaining aging time and an aging message transmission interval on which the ARP module performing keepalive on the next hop is based comprises:

when the ARP module is notified by the strategy routing or static routing module to perform keepalive on the next hop, obtaining the aging time and the aging message transmission interval carried therein; or when a parameter is not set by the strategy routing or static routing module, selecting the aging time and the aging message transmission interval of a routing keepalive attribute entry which is configured under a layer 3 interface; or when not obtaining from both of the above cases, selecting the aging time and the aging message transmission interval of a usual dynamic entry which is configured under a layer 3 interface.

The above method further comprises: after the aging time expires, the ARP module transmitting a unicast ARP request message, and if receiving an ARP response, updating a dynamic ARP entry; and if not receiving the ARP response, retransmitting the unicast ARP request message every 3 seconds, and if not receiving the ARP response message after the unicast ARP request message is transmitted three times, deleting the dynamic ARP.

The embodiments of the present document also provide a device, and the technical scheme is as follows.

A configuration unit is configured to configure an IP address and a mask code for network devices of a home terminal and an opposite terminal;

a strategy routing or static routing unit is configured to regularly inquire whether an ARP entry to which a next hop corresponds exists, if the ARP entry exists, a link to be available, otherwise, notify an ARP unit to perform keepalive on the next hop; and the ARP unit is configured to perform a process of keepalive on the next hop, and after perform keepalive on the next hop, notify the strategy routing or static routing unit to judge whether the link is available.

The strategy routing or static routing unit is configured to scan next hops of the configured routing entries by way of polling, and the number of the next hops for each scan is less than or equal to 100.

The ARP unit is configured to perform the process of keepalive on the next hop by the following way: judging whether the ARP entry to which the next hop needed to be performed keepalive corresponds exists, and if the ARP entry exists, normally returning; and if the ARP entry does not exist, generating a corresponding unavailable (waiting) entry and transmitting an ARP request using the next hop needed to be performed keepalive as a destination IP, and updating as an available dynamic ARP entry after receiving an ARP response from the opposite terminal.

A way of obtaining aging time and an aging message transmission interval on which the ARP unit performing keepalive on the next hop is based comprises:

when the ARP unit is notified by the strategy routing or static routing unit to perform keepalive on the next hop, obtaining the aging time and the aging message transmission interval carried therein; or when a parameter is not set by a routing module, selecting the aging time and the aging message transmission interval of a routing keepalive attribute entry which is configured under a layer 3 interface; or when not obtaining from both of the above cases, selecting the aging time and the aging message transmission interval of a usual dynamic entry which is configured under a layer 3 interface.

The ARP unit is further configured to: after the aging time expires, transmit a unicast ARP request message, and if receiving an ARP response, update a dynamic ARP entry; and if not receiving the ARP response, retransmit the unicast ARP request message every 3 seconds, and if not receiving the ARP response message after the unicast ARP request message is transmitted three times, delete the dynamic ARP.

In order to implement the above inventive objective, the specific technical scheme of the present document is as follows.

An IP address and a mask code are configured for a layer 3 interface of network devices of a home terminal and an opposite terminal;

strategy routing or static routing is configured for the network devices of the home terminal and the opposite terminal, wherein the next hop is an IP address which directly connects with the layer 3 interface of the device of the opposite terminal or an ARP agency function is started;

the strategy routing or static routing module starts a timer to regularly inquire whether an available ARP entry to which the next hop corresponds exists, and if the available ARP entry exists, it is considered that the link is available, and if the available ARP entry does not exist, it is considered that the link is not available, and the strategy routing or static routing module notifies the ARP module to perform keepalive on the next hop; and through the interaction of ARP messages, the ARP module calls back immediately to notify the strategy routing or static routing module to judge whether the link is available after generating, updating or deleting the available ARP entry.

The specific implementations are as follows.

The network devices of the home terminal and the opposite terminal cannot be connected with each other using a layer 3 device, but can be connected with each other using only a layer 1 or layer 2 device;

a plurality of IP addresses and mask codes can be configured on the layer 3 interface, but the network segments cannot conflict;

a directly connected route to which the IP address and the mask code on the layer 3 interface corresponds is generated;

an inherent ARP to which the IP address on the layer 3 interface corresponds is generated.

When the next hop of the strategy routing or static routing is an IP address which directly connects the layer 3 interface of the device of the opposite terminal, an ARP request is transmitted using the IP address of the layer 3 interface of the opposite terminal as a destination IP, the opposite terminal responds directly, and the ARP agency needs not to be started;

when the next hop of the strategy routing or static routing is not an IP address which directly connects the layer 3 interface of the device of the opposite terminal, the opposite terminal must start the ARP agency function and then can respond the ARP response message;

The inherent ARP to which the IP address of the layer 3 interface corresponds is generated.

The strategy routing or static routing module starts the periodic timer after initialization;

the strategy routing or static routing module scans the next hops of the configured routing entries by way of polling, the number for each scan is fixed, and the range of the number is adjustable, but the number is inappropriate to be larger than 100;

it is judged whether the available ARP entry to which the next hop corresponds exists, and if the available ARP entry exists, it is considered that the link to which the next hop corresponds is available, and if the available ARP entry does not exist, it is considered that the link to which the next hop corresponds is unavailable;

the strategy routing or static routing module notifies the ARP module to perform keepalive on the next hop, the ARP module judges whether the available ARP entry to which the next hop needed to be performed keepalive corresponds exists, and if the available ARP entry exists, performs normally returning, and if the available ARP entry does not exist, generates a corresponding waiting (unavailable) entry and transmits an ARP request using the next hop needed to be performed keepalive as a destination IP, and updates to an available dynamic ARP entry after receiving an ARP response from the opposite terminal, and the multiplexing ARP aging flow is specifically implemented;

the ARP entry to which the next hop corresponds will not be configured statically as far as possible, because the static ARP entry also belongs to the available ARP entry; the priority of the static ARP entry is higher than the priority of the dynamic ARP entry; and, when the link is normal, the learned dynamic ARP entry does not cover the static ARP entry, and when the link is abnormal, the static ARP entry cannot be deleted, i.e., the available ARP entry still exists, which does not implement the link fault detection and recovery based on ARP interaction.

The ARP module uses a callback function mechanism to notify a registered service module after generating, updating or deleting the available ARP entry, so as to increase the extensibility of functions;

the ARP module calls back immediately to notify the strategy routing or static routing module to deal with after generating, updating or deleting the available ARP entry, which avoids that the polling time is too long and the response cannot be obtained timely when the routing entries are too many;

the ARP module sets a routing keepalive attribute, which is referred to as a routing keepalive entry, for a dynamic ARP entry generated by the keepalive of the next hop; the range of aging time of the routing keepalive entry is between 1 s and 65535s, and the range of an aging message transmission interval of the routing keepalive entry is between 1 s and 30 s; and, if the configured aging time and the configured aging message transmission interval is within seconds, the time of detecting link as 'down' is also within seconds;

the way of obtaining the aging time and the aging message transmission interval of the routing keepalive entry comprises: firstly, preferably selecting the aging time and the aging message transmission interval carried by the routing module when the routing notifies the ARP module to perform keepalive on the next hop; secondly, when the routing module does not set a parameter, selecting the aging time and the aging message transmission interval of the routing keepalive attribute entry configured under the layer 3 interface; and finally, when both of the above cases can not obtain the aging time and the aging message transmitting interval, selecting the aging time and the aging message transmission interval of a usual dynamic entry configured under the layer 3 interface;

after the ARP module generates the routing keepalive entry, it ages according to the usual aging time which is configured under the layer 3 interface by default; after the aging time expires, the ARP module transmits a unicast ARP request message, and if receiving an ARP response, it updates a dynamic ARP entry; and, if not receiving the ARP response, it retransmits the unicast ARP request message every 3 seconds and the unicast ARP request message is transmitted at most three times, and if not receiving the ARP response message when transmitting three times, it deletes the dynamic ARP;

the ARP module starts the aging periodic timer after initialization;

the ARP module scans the routing keepalive ARP entries by way of polling, the number for each scan is fixed, and the range of the number is adjustable, but the number is inappropriate to be larger than 100.

FIG. 1 is a schematic diagram of networking of an application of link fault detection and recovery based on ARP protocol interaction according to the present document. As shown in FIG. 1, Giga_1/1 and Giga_1/2 on a router 1 are connected to Giga_1/1 and Giga_1/2 on a router 2 respectively. The data traffic between the router 1 and the router 2 is received and forwarded via a link 1 and a link 2 at the same time in accordance with a load sharing mode; a part of traffic is forwarded from the upper path (link 1), and a part of traffic is forwarded from the lower path (link 2). When the link 1 (or link 2) has fault, the ECMP re-calculates the load sharing, and the traffic is forwarded from the link 2 (or link 1); and when the fault of the link 1 (or link 2) is recovered, the ECMP re-calculates the load sharing, and the traffic is forwarded from the link 1 and the link 2, thus effectively implementing redundancy protection of the ECMP link.

Whether the link has fault and whether the fault is recovered are determined by whether the ARP request and response message can be interacted. From hierarchy of layer of an Open System Interconnection (OSI) model of the network, such detection can detect the connectivity of the router 1 from a network layer to a link layer and then to a physical layer and the router 2 from a physical layer to a link layer and then to a network layer, vice versa. From the perspective of the actual application, such detection can detect whether the configuration of the IP address which directly connects the layer 3 interface of the router is correct, whether the routing configuration is correct, whether a protocol layer of the device operates normally, whether a forwarding layer operates normally, and whether the connection of the physical link which connects two devices between the router 1 and the router 2 is normal. The scenarios where the static routing and the strategy routing support the ECMP function is merely one scenario where the method of judging whether the link has fault and whether the fault is recovered by whether the ARP request and response messages can be interacted normally is applied, and in the actual application, the method for detecting the link by the ARP can be applied flexibly according to the specific networking.

Figure 2:
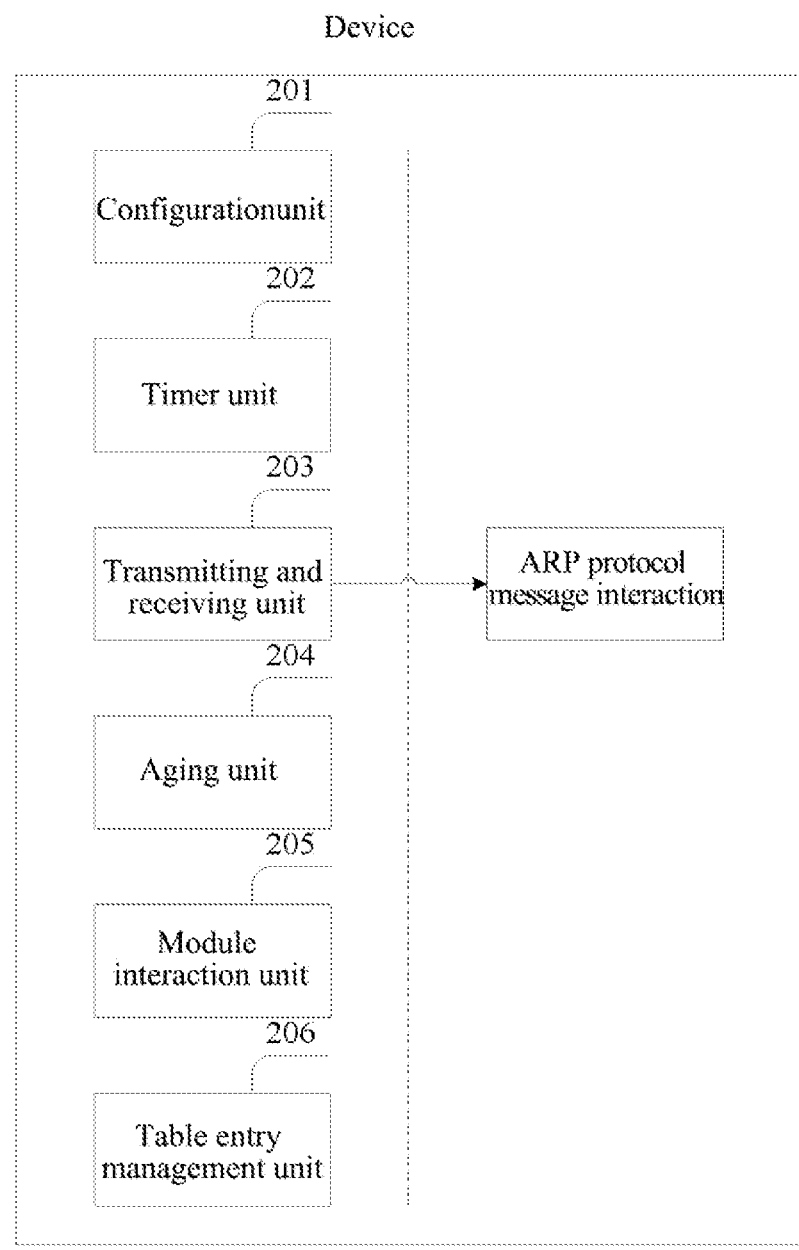
FIG. 2 is a structure diagram of a device with which the present document is applied.

FIG. 2 is a structural diagram of a device for a link fault detection and recovery function based on ARP interaction according to the present document, wherein, the device comprises the following units.

A configuration unit 201 is configured to configure the required configuration parameters and performance parameters satisfying the networking performance according to the networking, wherein, the configuration unit comprises:

configuring an IP address and a mask code of a layer 3 interface;

configuring an ARP function;

configuring aging time and an aging message transmission interval of strategy routing or static routing;

configuring aging time and an aging message transmission interval of a routing keepalive attribute entry under the layer 3 interface;

configuring aging time and an aging message transmission interval of a normal dynamic entry under the layer 3 interface;

actually, the use of the aging time and the aging message transmission interval of the routing keepalive attribute entry by default can completely satisfy most of the networking requirements, and at this time, there is no need to add any new parameter configuration for this function.

A timer unit 202 is configured to regularly notify a strategy routing module, a static routing module and an ARP module according to the set time of the timer;

wherein, the timer unit comprises:

a strategy routing or static routing timer, responsible for regularly inquire whether the available ARP entry to which the next hop corresponds exists, so as to further judge whether the next hop is available;

an ARP timer, responsible for regularly notify an aging unit.

A transmitting and receiving processing unit 203 is configured to encapsulate and analyze a hardware address type, a software address type, a hardware address length, a software address length, an operation type, a source MAC, a source IP, a destination MAC, a destination IP of a protocol data portion of an ARP message, and a destination MAC, a source MAC, a protocol type of a layer 2 header of the ARP message, and transmit the ARP message to the network or receive the ARP message from the network and process.

An aging unit 204 is configured to traverse ARP entries, regularly transmit the ARP request for a single dynamic ARP, update the dynamic ARP entry after receiving the ARP response from the opposite terminal, and delete the dynamic ARP entry after the ARP response is not received when being transmitted three times;

wherein, the aging unit comprises:

scanning the routing keepalive ARP entries by way of polling after the aging time timer expires, the number for each scan is fixed, and the range of the number is adjustable, but the number is inappropriate to be larger than 100;

after the aging time of the routing keepalive ARP entry expires, transmitting a unicast ARP request message using the routing keepalive next hop of the strategy routing or the static routing as a destination IP;

receiving an ARP response, and updating the dynamic ARP entry;

if not receiving the ARP response, retransmitting the unicast ARP request message every three seconds, wherein the unicast ARP request message is transmitted at most three times;

if not receiving the ARP response message when the ARP response message is transmitted three times, deleting the dynamic ARP.

A module interaction unit 205 is configured to notify the ARP module by the strategy routing or static routing module to perform keepalive on the next hop, and to notify the strategy routing or static routing module by the ARP module to judge whether the link is available;

wherein, the module interaction unit comprises:

the strategy routing or static routing module inquiring whether the available ARP entry to which the next hop corresponds exists;

if the available ARP entry does not exist, notifying the ARP module to perform keepalive on the next hop;

after generating, updating and deleting the available ARP entry, the ARP module calling back to notify the strategy routing or static routing module to judge whether the link is available.

A table entry management unit 206 is configured to provide management of ARP routing keepalive attribute and generation, updating, deleting and inquiring of the ARP entries.

Figure 3:
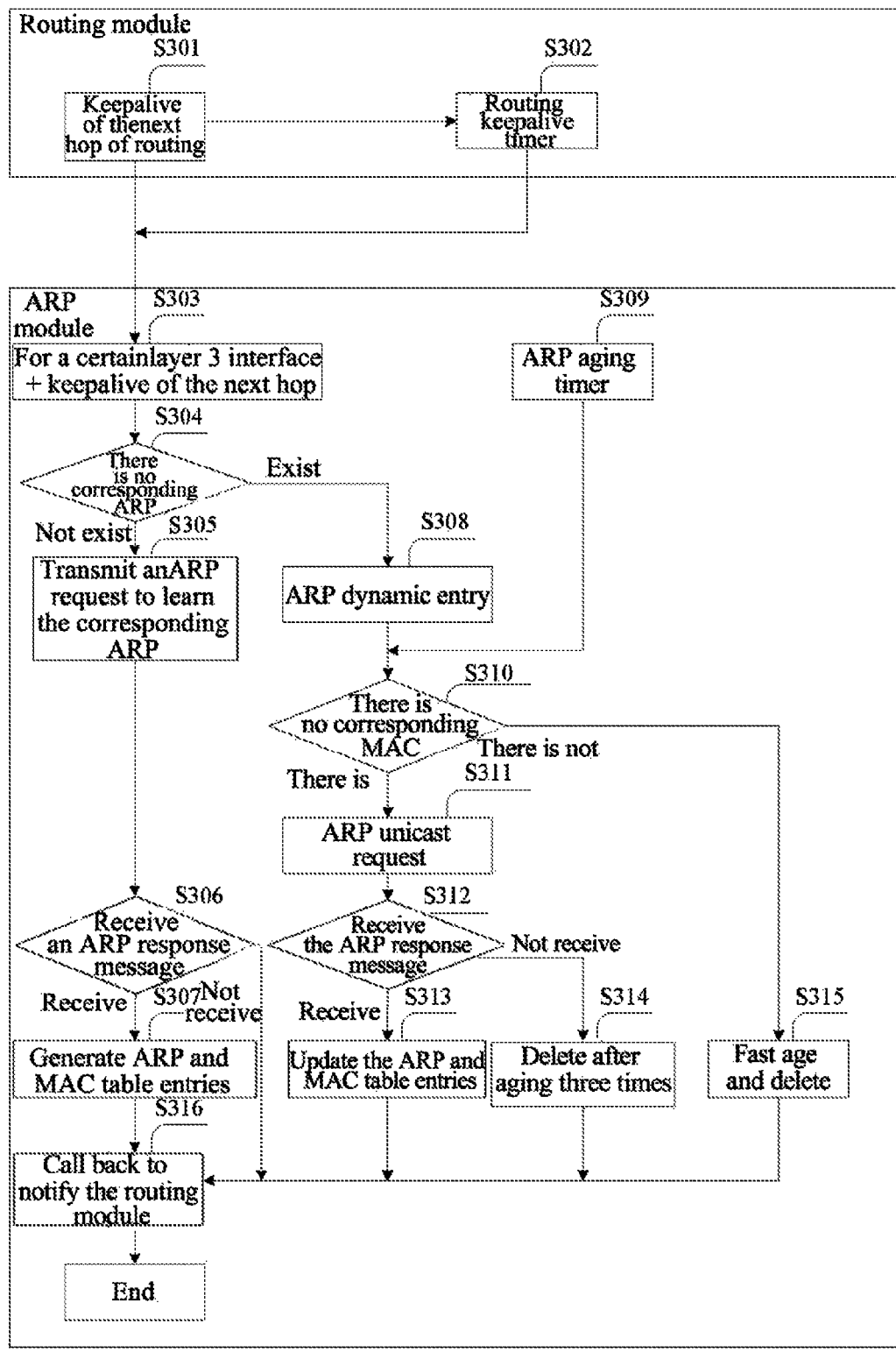
FIG. 3 is a flowchart of a routing keepalive mechanism with which the present document is applied.

FIG. 3 is a flowchart of a routing keepalive mechanism of a link fault detection and recovery function of based on ARP interaction according to the present document, comprising the following steps.

In step 301, routing next hop keepalive is used to specify the next hop needed to be performed the keepalive.

In step 302, routing next hop keepalive timer is used for timing being expiry to trigger the inquiry whether the keepalive ARP entry to which the next hop needed to be performed keepalive corresponds exists and is available, and if it does not exist or is not available, the traffic transmission is stopped and the ARP module is notified, and if it exists and is available, the link can be used to transmit and receive the traffic.

In step 303, the next hop keptalive under the layer 3 interface is used for the ARP module obtaining the next hop needed to be performed keepalive, the output interface of the layer 3, and the aging parameters which are notified by the routing module.

In step 304, it is judged whether the keepalive ARP entry exists, and if it does not exist, go to step 305, and if it exists, go to step S308.

In step 305, the ARP entry of the waiting (unavailable) state of the keepalive attribute is generated, and the broadcast ARP request is transmitted using the next hop needed to be performed keepalive as a destination IP.

In step 306, it is judged whether the ARP response of the opposite terminal is received, and if the ARP response is not received, go to the end, and if the ARP response is received, go to step S307.

In step 307, ARP and MAC table entries are generated (the MAC table entries need to be generated on a layer 3 switch, and the MAC table entries need not to be generated on the router), the forwarded table entries routing of layer 2 and layer 3, ARP and MAC of the two devices which are connected with each other directly exist, the physical link is also normally connected, and the traffic can be normally forwarded.

In step 308, the ARP entry to which the next hop needed to be performed the keepalive corresponds exists, and then the keepalive attribute is set (when the ARP entry to which the keepalive next hop corresponds needs to be deleted, the keepalive attribute can be cleared directly, and the dynamic ARP entry can automatically age and delete).

In step 309, the ARP aging timer is used to trigger the ARP aging, transverse the available ARP entries, and judge whether the configuration of the aging parameters satisfies an aging condition for each entry, and if the aging condition is satisfied, the aging begins, and if the aging condition is not satisfied, the aging is skipped.

In step 310, it is judged whether the MAC to which the ARP entry corresponds exists, if it does not exist, go to step S315, and if it exists, go to step S311.

In step 311, as the destination MAC of the ARP entry is known at this time, it only needs to transmit a unicast ARP request without transmitting the broadcast ARP request so as to reduce the network burden.

In step 312, it is judged whether the ARP response of the opposite terminal is received, and if the ARP response is not received and the aging occurs three times, go to step S314, and if the ARP response is received, go to step S313.

In step 313, the ARP and MAC table entries are updated.

In step 314, if the aging occurs three times and the ARP response is not received, the dynamic ARP entry is deleted.

In step 315, fast aging does not concerns whether the ARP aging time of the current dynamic ARP entry expires, the ARP request message is transmitted immediately and the aging begins.

In step 316, the ARP module calls back immediately to notify the strategy routing or static routing module to process after generating, updating or deleting the available ARP entries.

In conclusion, the present document multiplexes and improves the ARP aging flow based on the ARP interaction, implements the purpose of routing keepalive through the routing keepalive mechanism, solves the problem in the related art that: the link detection can not be implemented after the strategy routing or the static routing is applied, or the configuration is complex and the system overhead is large due to the start of the BFD detection.

A person having ordinary skill in the art can understand that all or a part of steps in the above method can be implemented by programs instructing related hardware, and the programs can be stored in a computer readable storage medium, such as a read-only memory, disk or optical disk, etc. Alternatively, all or a part of steps in the above embodiments can also be implemented by one or more integrated circuits. Accordingly, each module/unit in the above embodiments can be implemented in a form of hardware, or can also be implemented in a form of software functional modules. The present document is not limited to any particular form of a combination of hardware and software.

Of course, the present document can further have a variety of other embodiments, and those skilled in the art can make various corresponding changes and variations according to the present document without departing from the spirit and essence of the present document, but these corresponding changes and variations should belong to the protection scope of the appending claims of the present document.

INDUSTRIAL APPLICABILITY

The present document multiplexes and improves the ARP aging flow based on the ARP interaction, implements the purpose of routing keepalive through the routing keepalive mechanism, solves the problem in the related art that: the link detection can not be implemented after the strategy routing or the static routing is applied, or the configuration is complex and the system overhead is large due to the start of the BFD detection.

What is claimed is:

1. A method for link fault detection and recovery based on Address Resolution Protocol (ARP) interaction, comprising:
    allocating an IP address and a mask code for network devices of a home terminal and an opposite terminal; the network devices of the home terminal and the opposite terminal respectively comprise a processor configured to perform a strategy routing or static routing module and an ARP module;
    the strategy routing or static routing module regularly inquiring whether an available ARP entry corresponding to a next-hop routing exists;
    if the available ARP entry corresponding to the next-hop routing exists, determining that a link corresponding to the next-hop routing is available,
    if the available ARP entry corresponding to the next-hop routing does not exist, notifying the ARP module to perform keepalive processing on the next-hop routing; and
    the ARP module performing keepalive on the next-hop routing, and notifying the strategy routing or static routing module to judge whether the link corresponding to the next-hop routing is available after performing keepalive on the next-hop routing;
    wherein the step of performing keepalive processing on the next-hop routing comprises: judging whether the ARP entry corresponding to the next-hop routing on which the keepalive processing is needed to perform exists, when the ARP entry exists, normally returning; and when the ARP entry does not exist, generating a unavailable (waiting) entry and transmitting an ARP request using the next-hop routing needed to be performed keepalive as a destination IP, and updating as an available dynamic ARP entry after receiving an ARP response from the opposite terminal.

2. The method according to claim 1, further comprising: the strategy routing or static routing module scanning next-hops routing of the configured routing entries by way of polling.

3. The method according to claim 2, wherein, the number of the next-hops routing of the configured routing entries which are scanned each time is less than or equal to 100.

4. The method according to claim 1, wherein, a way of obtaining aging time and an aging message transmission interval on which the ARP module performing keepalive processing on the next-hop routing is based comprises:
    when a parameter is not set by the routing module, selecting the aging time and the aging message transmission interval of a routing keepalive attribute entry which is configured under a layer 3 interface; or
    when the aging time and the aging message transmission interval cannot be obtained from both of the above cases, selecting the aging time and the aging message transmission interval of a usual dynamic entry which is configured under a layer 3 interface.

5. The method according to claim 4, further comprising: after the aging time expires, the ARP module transmitting a unicast ARP request message, and when receiving an ARP response, updating a dynamic ARP entry; and when not receiving the ARP response, retransmitting the unicast ARP request message every 3 seconds, and when not receiving the ARP response message after the unicast ARP request message is transmitted three times, deleting the dynamic ARP.

6. A device for link fault detection and recovery based on Address Resolution Protocol (ARP) interaction, comprising at least one processor configured to perform an allocation unit, a strategy routing or static routing unit and an ARP unit, wherein:

the allocation unit is configured to allocate an IP address and a mask code for network devices of a home terminal and an opposite terminal;

the strategy routing or static routing unit is configured to regularly inquire whether an available ARP entry corresponding to a next-hop routing exists, determine that a link corresponding to the next-hop routing is available if an available ARP entry corresponding to a next-hop routing exists, notify the ARP unit to perform keepalive processing on the next-hop routing if the available ARP entry corresponding to a next-hop routing does not exist; and the ARP unit is configured to perform keepalive processing on the next-hop routing, and notify the strategy routing or static routing unit to judge whether the link corresponding to the next-hop routing is available after perform keepalive on the next-hop routing;

wherein the ARP unit is configured to perform keepalive processing on the next-hop routing by the following way: judging whether the ARP entry corresponding to the next-hop routing on which the keepalive processing is needed to perform exists, and when the ARP entry exists, normally returning; and when the ARP entry does not exist, generating a unavailable (waiting) entry and transmitting an ARP request using the next-hop routing on which the keepalive processing is needed to perform as a destination IP, and updating as an available dynamic ARP entry after receiving an ARP response from the opposite terminal;

the device also comprises a memory, configured to store the IP address, the mask code and the ARP entry.

7. The device according to claim 6, wherein, the strategy routing or static routing unit is further configured to scan next-hops routing of the configured routing entries by way of polling.

8. The device according to claim 7, wherein, the number of the next-hops routing of the configured routing entries which are scanned each time by the strategy routing or static routing unit is less than or equal to 100.

9. The device according to claim 6, wherein, a way of obtaining aging time and an aging message transmission interval on which the ARP unit performing keepalive on the next-hop routing is based comprises:

when the ARP unit is notified by the strategy routing or static routing unit to perform keepalive on the next-hop routing, obtaining the aging time and the aging message transmission interval carried therein; or when a parameter is not set by a routing module, selecting the aging time and the aging message transmission interval of a routing keepalive attribute entry which is configured under a layer 3 interface; or when not obtaining from both of the above cases, selecting the aging time and the aging message transmission interval of a usual dynamic entry which is configured under a layer 3 interface.

10. The device according to claim 9, wherein, the ARP unit is further configured to transmit a unicast ARP request message after the aging time expires, and when receiving an ARP response, update a dynamic ARP entry; and when not receiving the ARP response, retransmit the unicast ARP request message every 3 seconds, and when not receiving the ARP response message after the unicast ARP request message is transmitted three times, delete the dynamic ARP.

* * * * *